United States Patent Office 3,170,300
Patented Feb. 23, 1965

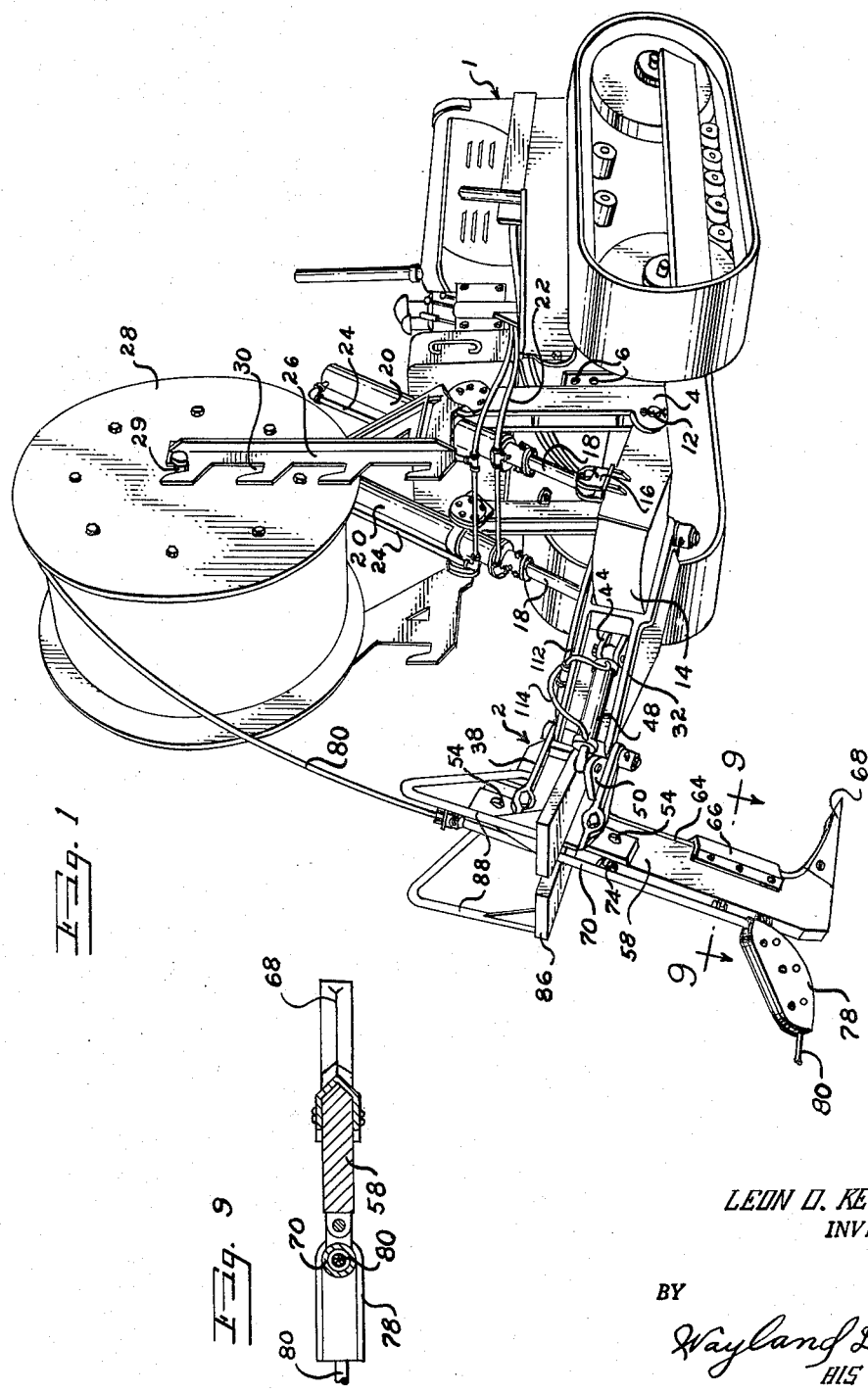

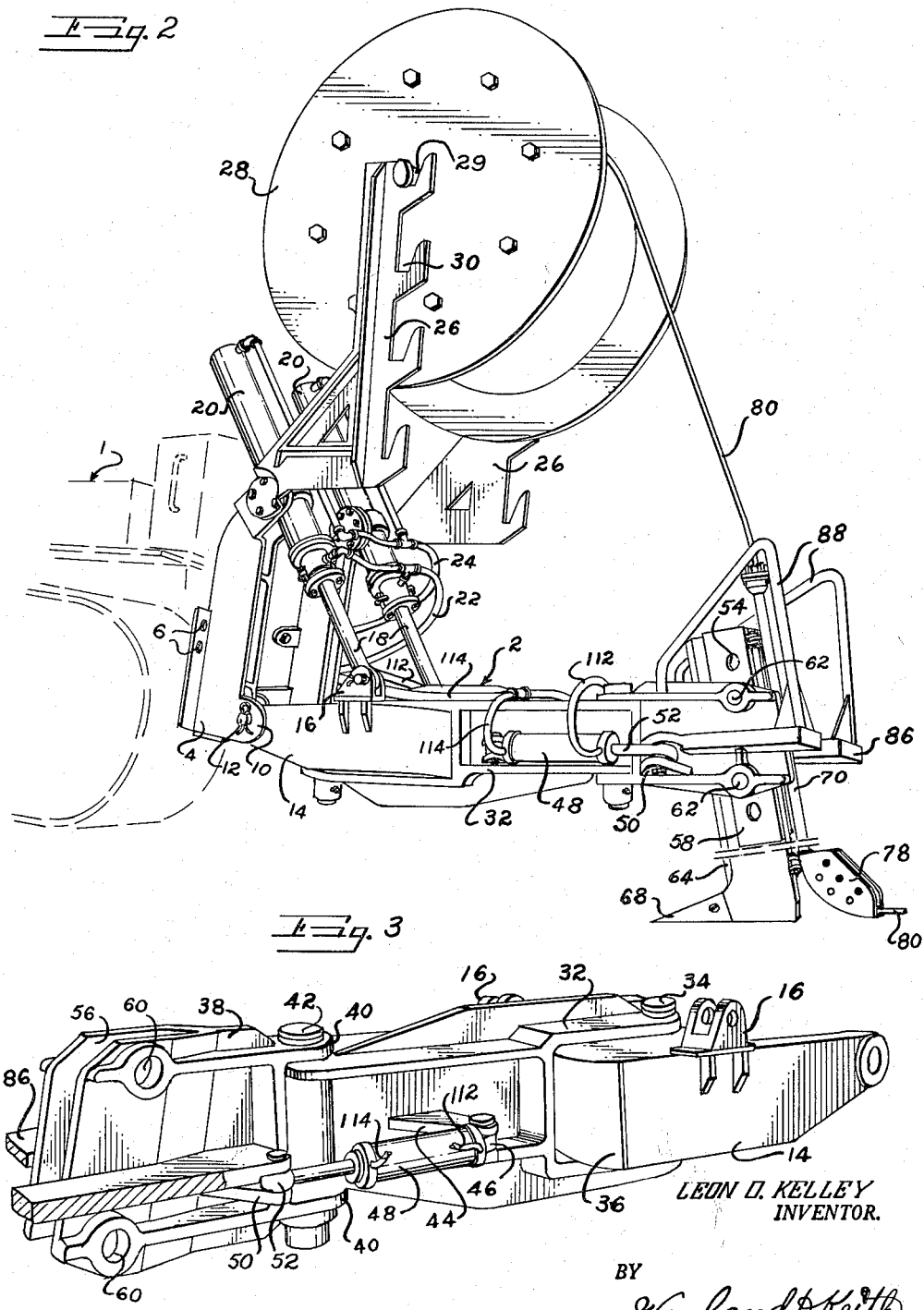

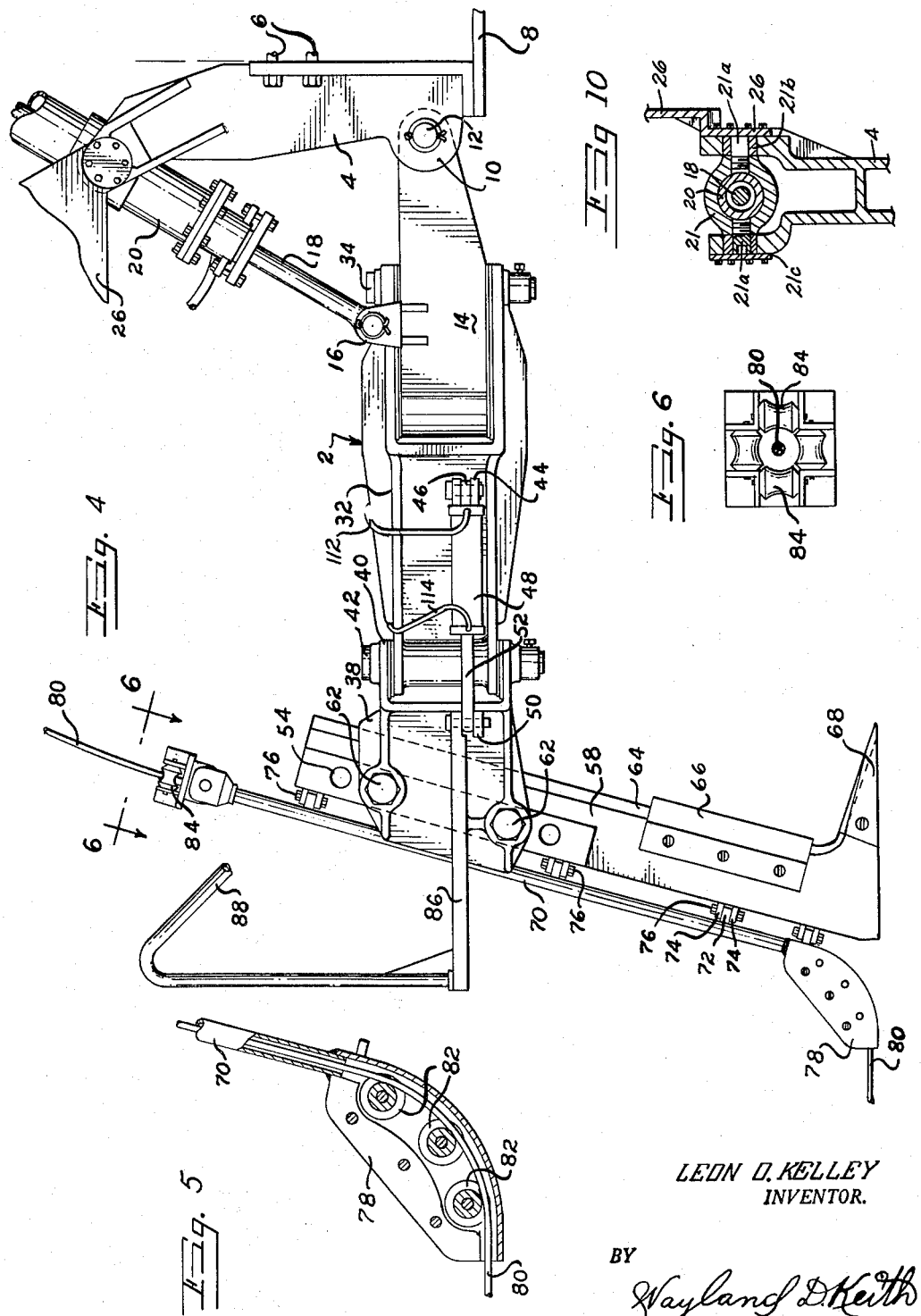

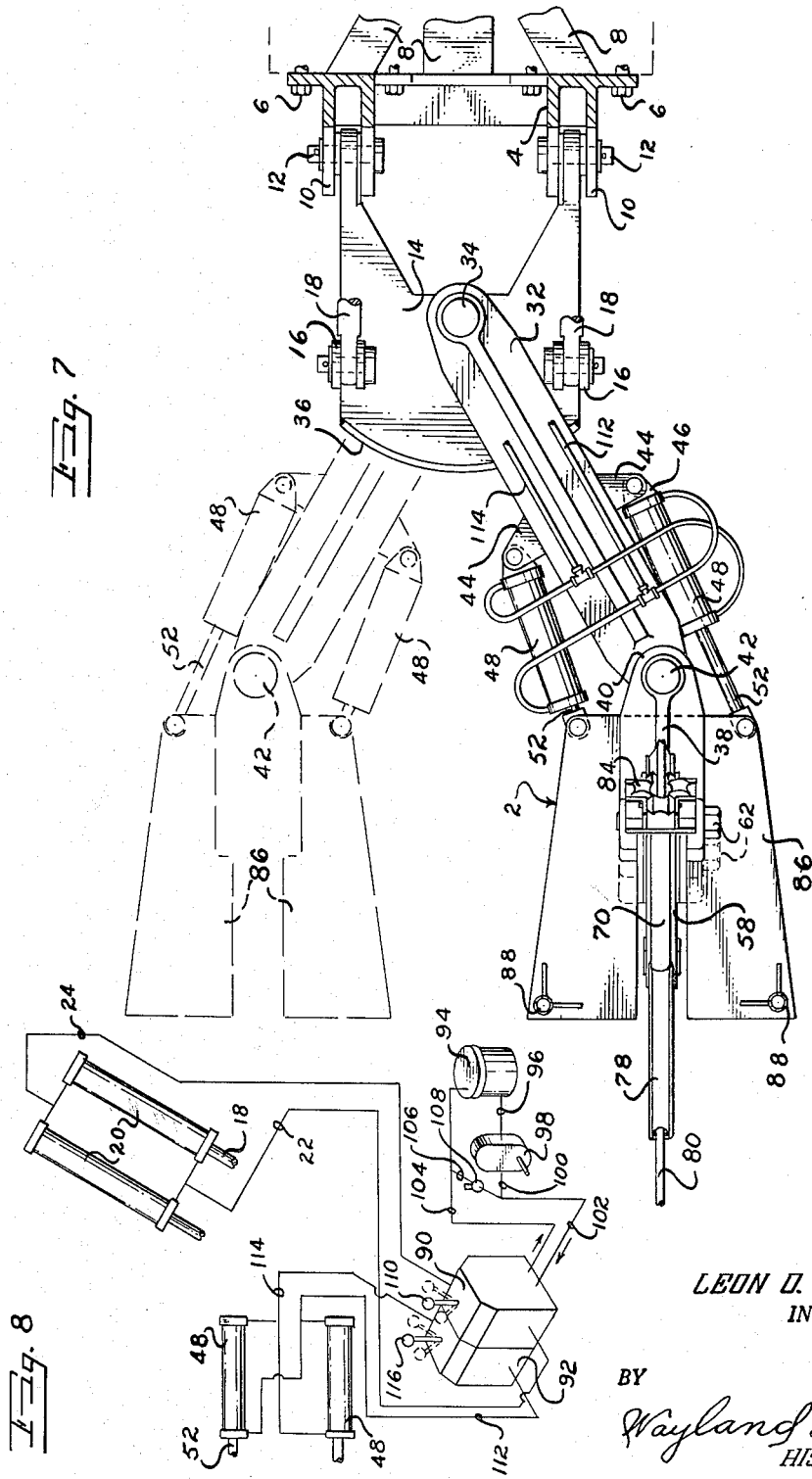

3,170,300
TRACTOR MOUNTED CABLE LAYING DEVICE
Leon O. Kelley, P.O. Box 488, Stamford, Tex.
Filed Aug. 8, 1960, Ser. No. 48,271
4 Claims. (Cl. 61—72.6)

This invention relates to improvements in plows for laying cable and flexible conduit, and more particularly to a tractor mounted plow for laying cable and flexible conduit.

Various cable laying plows have been proposed heretofore, but these, for the most part, were connected in trailing relation to a traction element, or, if mounted on and connected directly to the traction element, usually lacked such flexibility of control of the plow element that it could not be moved from side to side as well as up and down, so that the cable might be laid in the exact desired path.

The present device is so constructed that a tractor operator and a helper may readily lay hundreds of feet of cable per day, in an exact prescribed path and at the desired depth. The present cable laying attachment for a traction element is so constructed that it can lay cable or flexible conduit within a central path over which the traction element moves, or to either side thereof, thereby enabling the cable to be laid in close proximity to fences, walls or the like, where many other cable laying devices could not function.

An object of this invention is to provide a tractor mounted, cable laying attachment, which cable laying attachment is readily maneuverable to lay cable within a path over which the traction element moves, or to either side thereof.

Another object of the invention is to provide a cable laying attachment for a tractor, which may be manipulated by the operator to define a path independent of the path over which the tractor travels.

Still another object of the invention is to provide a traction element which will direct the cable or flexible conduit into a ditch formed by the plow of the cable laying attachment in such manner that the cable or flexible conduit will be placed thereinto without kinking or distortion of the element being laid.

A further object of the invention is provide a cable laying attachment for a traction element which is hydraulically controlled so that the operator of the traction element may control the operation of the attachment simultaneously with the control of the operation of the traction element.

Yet another object of the invention is to provide a cable laying attachment with a plow, the pull of which attachment is directed to the traction element at a point below the center of gravity, so as to maintain the traction element stable during the pulling of the plow through the earth.

With these objects in mind and others which will become manifest as the description proceeds, reference is to be had to the accompanying drawings in which like reference characters designate like parts in the several views thereof, in which:

FIG. 1 is a perspective view of the cable laying attachment taken from a side and the rear thereof and of the traction element, showing the plow of the cable laying attachment in raised position;

FIG. 2 is an enlarged, perspective view of the cable laying attachment taken from the rear and the side opposite that shown in FIG. 1, and showing the traction element in dashed outline, with parts of the plow being broken away and with parts being shortened to show the details of construction, with the plow of the attachment being shown in lowered position;

FIG. 3 is an enlarged fragmentary, perspective view taken from the top and a side, showing a portion of the framework on which the plow is mounted, the plow being removed therefrom, and with portions broken away and with portions shown in section to bring out the details of construction;

FIG. 4 is an enlarged side elevational view of the framework, as shown in FIG. 3, showing the plow attached thereto, with the hingeably mounted cable laying tube supported thereon and showing portions of the hydraulic cylinders connected thereto;

FIG. 5 is a fragmentary, enlarged side elevational view of the lower portion of the cable laying tube, with parts broken away and with parts shown in section, and showing a cable positioned therein;

FIG. 6 is an enlarged sectional view taken on the line 6—6 of FIG. 4, looking in the direction indicated by the arrows;

FIG. 7 is a fragmentary top plan view of the framework and the draw bar portion of the cable and flexible conduit laying attachment for tractors, with a portion of the tractor being shown in dashed outline, with the frame and the cable laying plow being shown in full outline in one position, the dashed outline showing the frame and cable laying plow in another position;

FIG. 8 is a diagrammatic view of the hydraulic system for controlling both the up and down movement of the cable laying attachment and the side to side movement of the plow thereof;

FIG. 9 is a sectional view taken on the line 9—9 of FIG. 1, looking in the direction indicated by the arrows; and FIG. 10 is a transverse sectional view of the hydraulic lifting jacks taken transversely through the pivot point thereof.

With more detailed reference to the drawing, the numeral 1 designates generally a traction element, which, in the present instance, is of the crawler or track laying type and upon which is mounted a cable laying attachment which is designated generally by the numeral 2. The cable laying attachment has an upright frame 4, which frame attaches to the rear of tractor 1 by means of bolts 6 and drawbars 8. The drawbars 8 extend forwardly of frame 4 and are attached to the lower side of the tractor in the manner illustrated in Patent No. 2,783,699 to C. O. Kelley, Ripper Plows, issued March 5, 1957. The upright frame 4 has rearwardly extending lugs 10 thereon, each which lug is apertured to pivotally receive a pin 12 therethrough and through apertured cable laying plow support frame 14, to pivotally mount the frame 14 for movement about a horizontal axis. The frame 14 is bifurcated, as is best seen in FIG. 7, and has a pair of upstanding apertured ears 16 on the upper side of the respective bifurcated portions of said frame, which pairs of ears are each adapted to receive the respective ends of an apertured connecting rod 18 of the respective hydraulic cylinders 20.

The hydraulic cylinders 20 are pivotally mounted on upstanding frame 4 and are so connected as to form jack means, so upon application of hydraulic pressure through conduits 22, the frame 14 may be pivoted about pivot pins 12 to raise frame 14, and when pressure is applied to conduits 24, the frame may be pivoted about pivot pins 12 to urge the frame 14 downward. The hydraulic cylinder 20, as best seen in FIG. 10, has a ring or support member 21 fixedly secured thereto intermediate the length thereof, which support member 21 has pins 21a extending outward therefrom and in axial alignment diametrically thereof, which pins are journaled in bearings 21b to enable pivotal movement of cylinder 20. Plates 21c and cap plate 26a retain the pins 21a and bearings 21b against lateral movement The frame 4 extends upward and has a cable rack 26 thereon, on which rack 26 a reel of cable or flexible conduit 28 may be supported. The shaft 29 of the reel 28 being positioned in a selected pair of the notched elements 30 of rack 26, as will be seen in FIGS. 1 and 2.

A frame 32 is bifurcated and transversely apertured, so that the frame 32 will receive frame 14 within the bifurcations thereof, so that the transverse apertures in frame 32 will register with the upright aperture in frame 14, whereupon, a pin 34 may be passed through these apertures which are in register, to pivotally connect frame 32 with frame 14 so that the frame 32 will swing about the upright axis of pin 34, as will best be seen in FIG. 7. The rear portion of frame 14 is arcuate, as indicated at 36, so as to permit free swinging action of frame 32 thereabout. The frame 32 has an upright aperture formed therethrough in the rear portion thereof.

A transversely apertured, bifurcated plow beam or tool bar holding element 38 is straddled over the rear portion of frame 32 so that the apertures formed transversely within the lugs 40 which form the bifurcated portions will register with the upright aperture in the rear portion of frame 32, whereupon, a pivot pin 42 is adapted to pass through the apertures in bifurcated tool holding element 38 and the aperture in the rear portion of frame 32 to form a pivotal action therebetween.

The frame 32 has outwardly extending lugs 44 on opposite sides thereof, which lugs are apertured near their outer ends to pivotally receive an apertured lug 46 of the respective hydraulic cylinders 48, so as to pivotally mount the hydraulic cylinders 48 with respect to the frame 32. A cylinder 48 is disposed on each opposite side of frame 32.

The tool bar holding element 38 has outwardly extending pairs of apertured lugs 50 on each side thereof, which respective pairs of lugs are adapted to receive the respective apertured ends of connecting rods 52 therebetween, so as to operatively connect the hydraulic cylinders 48 with tool bar holding element 38 to enable the pivotal movement thereof about the axis of pin 42. A tool bar or plow shank 58 is fitted within the vertical bifurcation 56 of the tool bar holder 38, so that certain apertures 54 will register with apertures 60 in frame 38, to enable pins or bolts 62 to be passed therethrough to hold the plow shank in fixed relation with respect to tool bar holder 38. It is preferable to have the tool bar shank beveled to form a cutting edge 64 on the forward side thereof, with a replaceable, sharp edge member 66 on at least a portion of the forward edge thereof so as to form a ground cutting element. A removable plow point or toe 68 is provided on the lower end of the tool bar or plow shank 58 which plow point 68 may be hard surfaced to resist wear.

A cable laying tube 70 is hingeably mounted on the rear side of plow shank 58, which cable laying tube has lugs 72 secured thereto which are adapted to be fitted within lugs 74, which lugs are apertured, and are adapted to receive a pin or bolt 76 through the respective sets of adjacent lugs, with the axis of all the pins or bolts 76 being common. In this manner the cable laying tube 70 and the outwardly extending shoe 78 are free to pivot in such manner as to direct cable 80 into the furrow opened by plow shank 58 and plow point 68.

The shoe 78 is preferably provided with removable side plates, within which sheave rollers 82 are mounted, as will best be seen in FIG. 5, which sheave rollers are so positioned as to permit the cable 80, which is moving through the tube 70, to pass arcuately by and below the sheaves 82 in such manner that the direction of the cable is transferred from an upright position to a substantially horizontal position, and in a position substantially behind the plow shank 58 at a point in approximately aligned relation with the lower face of plow shank 58, and, when being operated in the ground, will lay the cable within the furrow at the bottom thereof immediately following plow shank 58. The upper end of the cable tube 70 preferably has four spaced apart sheave rollers 84 so positioned that the cable passing thereover will be directed into the tube 70 with a minimum of friction.

The tool bar holder 38 preferably has platform 86 secured thereon, as will best be seen in FIGS. 4 and 7, so that a helper may stand thereon to guide cable 80 off reel 28 into tube 70, when it is desired to have a helper perform this operation. Hand rails 88 rise from platform 86 to provide hand holds for the helper.

The cylinders 48, one positioned on each side of frame 32, are pivoted to the frame 32 about vertical axes with the connecting rods 52 extending rearward, which connecting rods pivotally connect to tool bar holding element 38 in such manner that, upon application of hydraulic pressure to one end of one of the cylinders 48, and to the opposite end of the other of the cylinders 48, the tool bar holder 38 will be pivotally moved about the axis of pin 42, as will best be seen in FIG. 7, and since this will have a tendency to change the direction of point 68 on tool bar holding element 38, the plow shank 58 will be caused to travel in the direction indicated by the plow point 68, and by maintaining the hydraulic cylinders 48 in desired position, a furrow can be opened by the plow shank 58 in such manner that the direction and location of the furrow made by the plow beam is independent of the line of travel of the tractor 1, within the limits of movement of frame 32. In this manner, a furrow can be opened directly behind the traction element or to either side of the center line thereof, by manipulation of hydraulic control valve 92. The plow shanks 58 may vary in length, depending upon the depth at which the cable is to be laid, and which shanks may be of such length as to bury the cable to a depth of four feet or more, when necessity demands such depth.

The raising and lowering of frame 14, frame 32, tool bar holder 38, plow shank 58, and cable laying tube 70 which is hingably attached thereto, is accomplished by the manipulation of valve 90 to actuate hydraulic cylinders 20 which will move connecting rods 18 in and out to raise or lower the frame 14. Since the operation of the valve 90 is controlled from the driver's seat of tractor 1, by the manipulation of this hydraulic valve 90, the lateral movement of frame 32 is also controlled. By the manipulation of a hydraulic valve 92, as will best be seen diagrammatically in FIG. 8, the depth and the lateral positioning of the cable being laid may be accurately controlled.

The hydraulic system is shown diagrammatically in FIG. 8, wherein a reservoir 94 is provided for the hydraulic fluid with a conduit 96 leading therefrom to the inlet side of pump 98 and a discharge line 100 leads from pump 98 into conduit 102 which conduit leads to valves 90 and 92. A return conduit 104 returns the hydraulic fluid from valves 90 and 92 to the hydraulic reservoir 94. However, a branch conduit 106 interconnects conduits 100 and 104, and has a relief valve 108 therein, so upon stoppage of flow of hydraulic fluid through valves 90 and 92 hydraulic fluid will be by-passed through conduit 106 and relief valve 108 back into conduit 104 leading to reservoir 94, so as to prevent damage to the conduit or to the operating elements.

The valve 90 is provided with a three-position selector lever 110, which, when moved to one position, will hold the hydraulic fluid against movement in either direction. However, upon shifting the lever 110 into the position, as indicated in dashed outline in FIG. 8, the hydraulic fluid will be directed from conduit 102 into conduit 22, which will move connecting rods 18 of hydraulic cylinders 20 inward, with the expelled hydraulic fluid passing out through conduits 24 into valve 90 and thence into return conduit 104 and reservoir 94. However, upon moving the selector lever 110 of hydraulic valve 90 into the opposite position, as indicated by oppositely positioned dashed outline, the reverse flow in hydraulic lines 24 and 22 will be initiated, which will move plungers 18 outward. However, the hydraulic cylinders 20 and valve 90 are of the construction that the hydraulic cylinders may be held at any set position.

Hydraulic cylinders 48 are arranged on opposite sides of frame 32, and are so interconnected with hydraulic conduits 112 and 114 that hydraulic fluid will be directed into one end, or the connecting rod end of one cylinder, and into the opposed end of the other cylinder, so that equal but inverse movement of the connecting rod of the other cylinder is had. This is accomplished by connecting conduit 112 leading from valve 92 to one end of one of the hydraulic cylinders 48 and to the opposite end of the other hydraulic cylinder 48, with the respective ends being reckoned with respect to the connecting rods 52 and the conduit 114 connected in opposed or cross-over relation with respect to the conduit 112. In this manner, by manipulation of the selector lever 116 of valve 92 to one of the dashed outline positions shown in FIG. 8, the connecting rods of the hydraulic cylinders will be moved into one of the positions, as shown in FIG. 7, and by moving the valve actuator lever 116 to the opposite dashed outline position, as shown in FIG. 8, the connecting rod 52 of the hydraulic cylinder 48 will be moved into the opposite position as shown in FIG. 7, and indicated in full lines in the alternate position. In this manner the path of the plow point 68 of the plow on plow shank 58 can be controlled.

By having the frames 32 and 38, and the cable laying tube 70 pivotally mounted for pivotal movement about their respective upright axes, the operation of the device is more flexible and makes possible the laying of cable or flexible conduit into a ditch formed by the plow shank 58 along a defined path, which path is not necessarily limited to the actual path of a naturally trailed plow. The present arrangement is particularly adapted to opening a ditch and laying a cable therein in close proximity to a wall or fence, which will render the cable or conduit less vulnerable to being cut by earth working machines which are frequently used on highways and streets, where such cable and/or conduit is most frequently laid. In addition to laying multi-strand communication cable, the present device is also adapted to laying flexible conduit, such as conduit made of resinous plastics, rubber or the like.

While the invention has been illustrated and described in some detail in one embodiment thereof, it is to be understood that changes may be made in the minor details of construction and adaptations made to different cable or conduit laying jobs without departing from the spirit of the invention or the scope of the appended claims.

Having thus fully shown and described the invention what is claimed as new and desired to secure by Letters Patent is:

1. A device for laying cable, flexible conduit, and the like in combination with a traction element, which cable lying device comprises, a first frame rigidly mounted on said traction element and extending upwardly along the rear portion thereof, rearwardly extending, apertured lugs on the lower portion of said first frame, an apertured second frame pivotally mounted to said lugs on said first frame to move about a horizontal axis, fluid actuated jack means pivotally connected to said first frame and to said second frame so fluid pressure within said jack means will impart relative movement therebetween, a third frame pivotally mounted to said second frame and extending rearwardly therefrom for relative swinging movement about an upright axis between said second frame and said third frame, a fourth frame pivotally connected to the rear of said third frame for pivotal movement about an upright axis, at least one apertured lug extending horizontally outward on each opposite side of said third frame and at least one lug extending horizontally outward on each side of said fourth frame, a fluid actuated cylinder pivotally connected between ends of said apertured lugs on each side of said third frame and said fourth frame, pump means mounted on said traction element to supply fluid pressure to one end of one cylinder and to the opposite end of the other cylinder, simultaneously, conduit means for directing fluid from the other end of the respective cylinders, a plow beam adjustably connected to said fourth frame and having the lower end thereof extending downward therebelow, hinge members mounted on the rear side of said plow shank, a plow mounted on the lower end of said plow shank for engagement into the ground, a tube member, hinge members on said tube member, which hinge members on said tube member are complementary to the hinge members on said plow shank, pivot means pivotally connecting said complementary hinge members for pivotal movement of said tube member about an upright axis.

2. A device for laying cable, flexible conduit, and the like, in combination with a traction element, as defined in claim 1; wherein said fourth frame has a horizontal flat upper surface which forms a horizontal platform, said fourth frame having a bifurcation formed medially of said horizontal platform at the rear portion thereof, said plow shank extending through said horizontal platform, said bifurcation being of a width to permit free, unimpeded swinging movement of said tube member about the pivot of said hinge members.

3. A device for laying cable, flexible conduit, and the like, in combination with a traction element; which cable laying device comprises a first frame rigidly mounted on said traction element and extending upwardly along the rear portion thereof, rearwardly extending, apertured lugs on the lower portion of said first frame, an apertured second frame pivotally mounted on said lugs on said first frame to move about a horizontal axis, fluid actuated jack means pivotally connected to said first frame and to said second frame so fluid pressure within said jack means will impart relative movement therebetween, a third frame pivotally mounted on said second frame and extending rearwardly therefrom for relative swinging movement about an upright axis between said second frame and said third frame, a fourth frame pivotally connected to the rear of said third frame for pivotal movement about an upright axis, an apertured lug extending horizontally outward from a side of third frame, a lug extending horizontally outward on the same side of said fourth frame, a double acting, fluid actuated cylinder extending between said apertured lug on said third frame and said lug on said fourth frame and being pivotally connected thereto, a pump means mounted on said traction element to supply fluid pressure selectively to opposite ends of said fluid actuated cylinder, conduit means connected to the respective ends of said double acting, fluid actuated cylinder to selectively direct fluid under pressure thereto and therefrom, a plow shank adjustably connected to said fourth frame and having the lower end thereof extending downward therebelow, a plow mounted on the lower end of said plow shank for engagement into the ground, hinge members mounted on the rear side of said plow beam.

4. A device for laying cable, flexible conduit and the like in combination with a traction element, which cable laying device comprises; a first frame rigidly mounted on said traction element and extending upwardly along the rear portion thereof, rearwardly extending, apertured lugs on the lower portion of said first frame, an apertured second frame pivotally mounted on said lugs on said first frame to move about a horizontal axis, fluid actuated jack means pivotally connected to said first frame and to said second frame so fluid pressure within said jack means will impart relative movement therebetween, a third frame pivotally mounted on said second frame and extending rearwardly therefrom for relative swinging movement about an upright axis between said second frame and said third frame, a fourth frame pivotally connected to the rear of said third frame for pivotal movement about an upright axis, at least one apertured lug extending horizontally outward on each opposite side of said third frame, and at least one lug extending horizontally outward on each side of said fourth frame, a fluid actuated cylinder pivotally connected between ends of said apertured lugs on said third frame and said fourth frame on each side thereof, pump means mounted on the traction element to supply fluid pressure to one end of one of said cylinders and to the opposite end of the other of said cylinders, simultaneously, conduit means for directing fluid from the other end of the respective cylinders, a plow shank adjustably connected to said fourth frame and having the lower end thereof extending downward therebelow.

References Cited by the Examiner

UNITED STATES PATENTS

| | | | |
|---|---|---|---|
| 1,737,314 | 11/29 | Kirby | 61—72.6 |
| 2,386,025 | 10/45 | Wills. | |
| 2,414,994 | 1/47 | Wright. | |
| 2,663,515 | 12/53 | Kinsinger | 61—72.6 X |
| 2,722,181 | 11/55 | Hash | 61—72.6 |
| 2,766,536 | 10/56 | Perkins | 37—144 |
| 2,783,699 | 3/57 | Kelley | 172—464 |
| 2,788,906 | 4/57 | Davis | 214—138 |
| 2,797,629 | 7/57 | Kelley | 172—488 |
| 2,931,446 | 4/60 | Gwinn | 172—464 |
| 2,943,583 | 7/60 | Ryan | 61—72.6 |
| 3,045,368 | 7/62 | Whitcomb | 37—2 |

FOREIGN PATENTS

| | | |
|---|---|---|
| 694,195 | 12/30 | France. |
| 1,119,312 | 6/55 | France. |
| 1,156,475 | 12/57 | France. |
| 937,655 | 1/56 | Germany. |
| 4,564 | 1879 | Great Britain. |

OTHER REFERENCES

John Deere publication, OM-K57-1258, December 1958, pages 2, 4, 8, and 12.

EARL J. WITMER, *Primary Examiner.*

A. JOSEPH GOLDBERG, WILLIAM I. MUSHAKE, JACOB L. NACKENOFF, *Examiners.*